United States Patent [19]

Sasaki

[11] Patent Number: 4,975,939
[45] Date of Patent: Dec. 4, 1990

[54] CHANNEL CHANGING SYSTEM
[75] Inventor: Susumu Sasaki, Fujisawa, Japan
[73] Assignee: Fujitsu Limited, Kawasaki, Japan
[21] Appl. No.: 301,110
[22] Filed: Jan. 25, 1989
[30] Foreign Application Priority Data Jan. 25, 1988 [JP] Japan .................................... 63-13963

[51] Int. Cl.⁵ ............................................ H04M 11/00
[52] U.S. Cl. ......................................... 379/60; 379/59; 455/33
[58] Field of Search ....................... 379/60, 59; 455/33

[56] References Cited

U.S. PATENT DOCUMENTS

| 4,658,416 | 4/1987 | Tanaka | 379/57 |
| 4,740,788 | 4/1988 | Konneker | 340/825.44 |
| 4,752,951 | 6/1988 | Konneker | 379/211 |

FOREIGN PATENT DOCUMENTS

| 0034635 | 3/1983 | Japan | 379/61 |
| 0081352 | 5/1983 | Japan | 379/60 |
| 0171269 | 8/1986 | Japan | 379/60 |

Primary Examiner—James L. Dwyer
Assistant Examiner—Magdy Shehata
Attorney, Agent, or Firm—Staas & Halsey

[57] ABSTRACT

The present invention is a channel changing system in a mobile unit communication system comprising a plurality of radio base stations for communicating with movable stations through radio channels and a center station for accommodating such base stations and connecting these base stations with the public telephone network. The center station is configured comprising a private branch exchanger for accommodating the public telephone network and the lines extending from a plurality of base stations and a controller for controlling changing of communication channels by supervising the signal receiving levels between a movable station and a plurality of base stations. The controller is configured so that it issues a channel changing command by detecting, based on the signal receiving levels, that a movable station has transferred to the radio zone of an adjacent base station from the radio zone of a certain base station. The private branch exchanger conducts the line changing depending on the channel changing command through an extension transfer to the base station line of adjacent base station from the base station line of the relevant base station.

7 Claims, 5 Drawing Sheets

CHANNEL CHANGING SYSTEM

BACKGROUND OF THE INVENTION

1. Field of the Invention

The present invention relates to a channel changing system in a mobile unit communication system forming a communication network with multiple radio zones such that channel changing depends on transfer of a mobile unit in the busy condition to an adjacent radio zone.

2. Description of the Related Art

As illustrated in FIG. 1, a mobile unit communication system has a configuration wherein radio base stations BS1~BSn are arranged in a plurality of radio zones #1~#n, causing movable stations MS scattered therein to be capable of radio communication with such radio base stations BS1~BSn and with regular telephone subscribers through the one or more center stations 100 accommodating radio base stations BS1~BSn.

In such a mobile unit communication system, if a movable station moves under the busy condition to the adjacent radio zone from a certain radio zone, channel changing process is required for continuation of communication. FIG. 2 illustrates a diagram for explaining the busy channel changing system through the frequency changing. That is, if a movable station MS having existed in the radio zone #(n−1) moves, for example, under the busy condition, to an adjacent radio zone #n, the radio zone #(n−1) is requested to change the radio frequency fa assigned to the radio base station BS(n−1) to the radio frequency fb assigned for the use to the radio base station BSn in the radio zone #n after the movement.

Because the radio frequency to be used is changed to different frequencies respectively for each radio zone, this frequency changing system provides less frequency interference between respective radio zones and can therefore be said to be a system easily assuring management. Accordingly, the system described here is suitable, for example, to a large capacity and wide range system such as an automobile telephone system linking a plurality of zones.

The mobile unit communication system described above changes communication channels, changing, if the mobile unit transfers to an adjacent radio zone, at the region where the receiving electric field between the movable stations in the boundary of radio zones is lowered. Therefore, a protection circuit or control circuit is complicated and becomes expensive. Accordingly, such channel changing is controlled, for example, by a particular exchange control apparatus such as an automobile telephone exchanger. Such system is more suitable to a large capacity and wide range system than to a regional small scale mobile unit communication system to which the applicable region is restricted because an expensive exchange control apparatus is required.

SUMMARY OF THE INVENTION

An object of the present invention is to provide a communication channel changing system for a mobile unit communication system which is capable of easily and economically changing the channel even under the busy condition.

The present invention is a channel changing system of a mobile unit communication system comprising a plurality of radio base stations making communication with movable stations through a radio channel and a control center station which accommodates such radio base stations for connecting them with a public telephone network. The center station is configurated comprising a private branch exchange accommodating the public telephone network and the lines extending from a plurality of radio base stations and a control apparatus which monitors signal receiving conditions to provide communication channel changing control. The control apparatus detects, based on the signal receiving condition, that a movable station moves to a radio zone of the adjacent base station from a radio zone of a certain base station and issues a channel changing command, while the private branch exchanger changes the line by transfer of extension to the line of the adjacent base station from the line to the certain base station depending on the movement of a movable station.

DESCRIPTION OF THE PREFERRED EMBODIMENT

Figure 1:
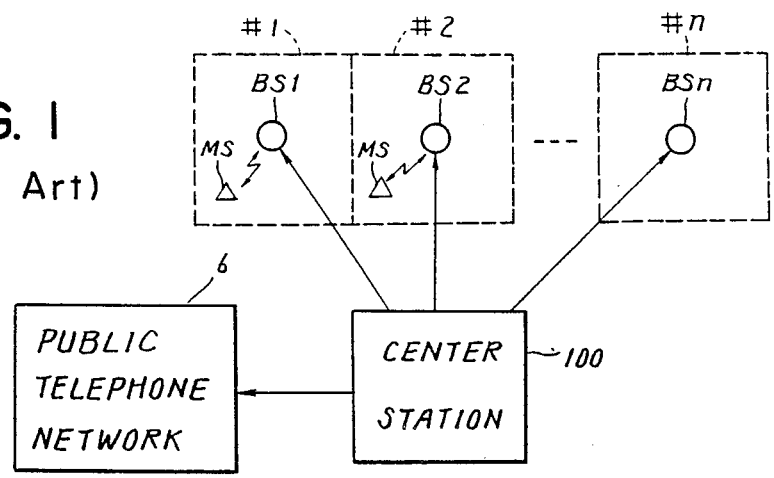
FIG. 1 is a structural diagram of an ordinary mobile unit communication system.
Figure 2:
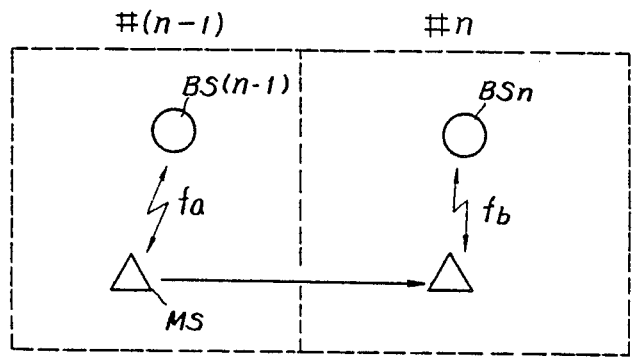
FIG. 2 is a diagram for explaining frequency change of communication channel due to zone transfer in the mobile unit communication system.
Figure 3:
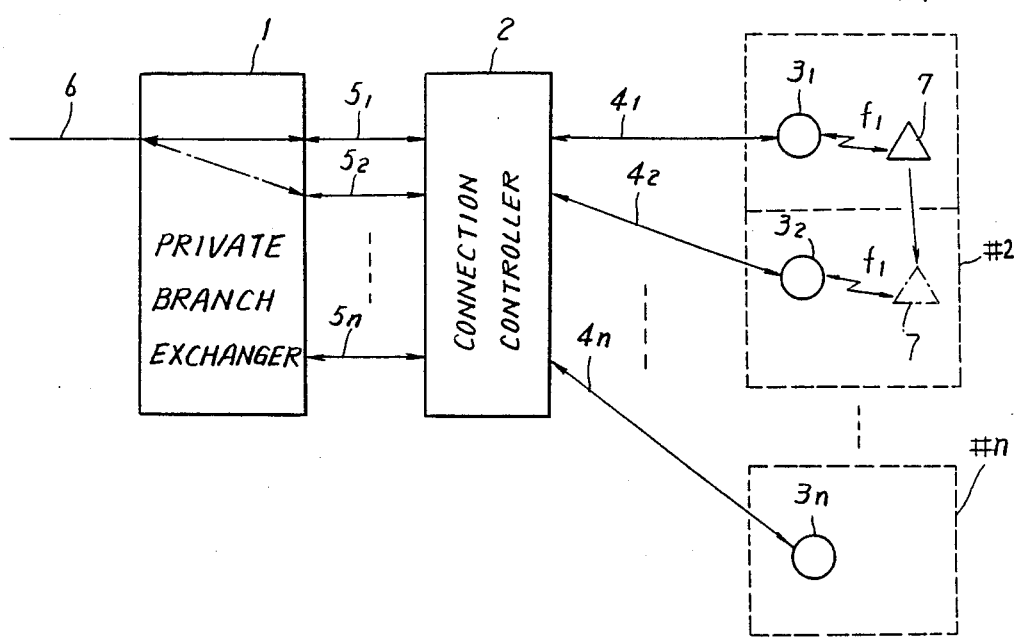
FIG. 3 is a block diagram of an embodiment of the present invention.

FIG. 3 illustrates a mobile unit communication system utilizing a channel changing system in mobile unit communication as an embodiment of the present invention. In FIG. 3, $3_1 \sim 3_n$ designate radio base stations. The base stations $3_1 \sim 3_n$ respectively have their own radio zones #1~#n, forming a communication service area. For example, m radio frequencies (radio channels) from $f_1 \sim f_m$ are used for the movable station 7 and radio base stations $3_1 \sim 3_n$ in this communication service area and the movable station 7 is capable of engaging in radio communication with the radio base station using only one frequency among the radio frequencies $f_1 \sim f_m$.

The sending and receiving frequency can be selected by changing, with a frequency synthesizer, the local oscillation frequency signal for converting the radio frequency (800 MHz, for example) and the intermediate frequency (455, for example).

Each radio base station $3_1 \sim 3_n$ makes communication with a movable station using a channel among the radio frequencies $f_1 \sim f_m$. However, while the movable station 7 uses the radio frequency $f_1$ for communication with the base station $3_1$, the other radio base stations $3_2 \sim 3_n$ in the same service area cannot use the radio frequency $f_1$ for communication with the other movable stations.

In addition to the radio communication with a movable station using a certain radio frequency, the radio base stations $3_1 \sim 3_n$ also monitor radio communication using the other radio frequencies and thereby send a call termination level signals to a connection controller 2 by supervising the termination level of all radio frequencies.

The private branch exchanger 1 and connection controller 2 compose a center station. The radio base station lines $4_1 \sim 4_n$ extending from the radio base stations $3_1 \sim 3_n$ are accommodated within the private branch exchanger 1 via the exchanger lines $5_1 \sim 5_n$. The private branch exchanger 1 is then extended to a public telephone network 6.

Figure 4:
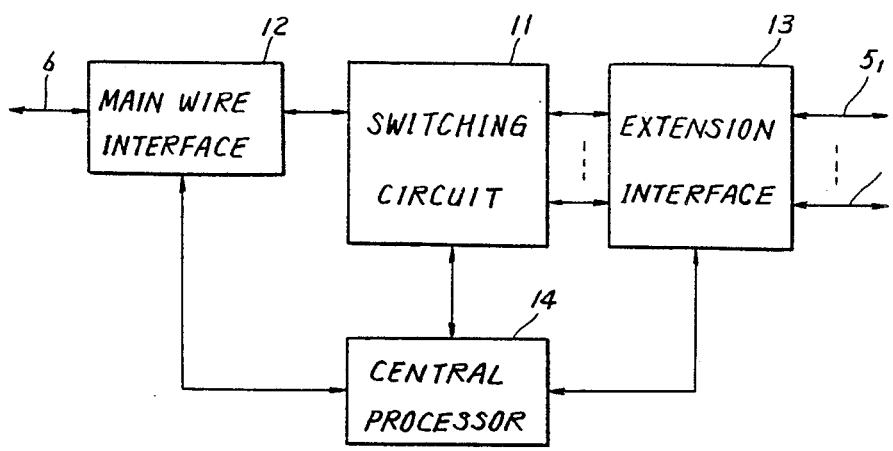
FIG. 4 is a block diagram of a private branch exchanger.

FIG. 4 illustrates the structure of the private branch exchanger. A switching circuit 11 is connected to the public telephone network 6 via a main wire interface 12 and also connected to the exchanger lines $5_1 \sim 5_n$ via an extension interface 13. A central processor 14 processes various control signals for the main wire and extension via respective interfaces 12, 13 and issues an instruction to the switching circuit 11 for connection with the main wire or extension wire.

Figure 5:
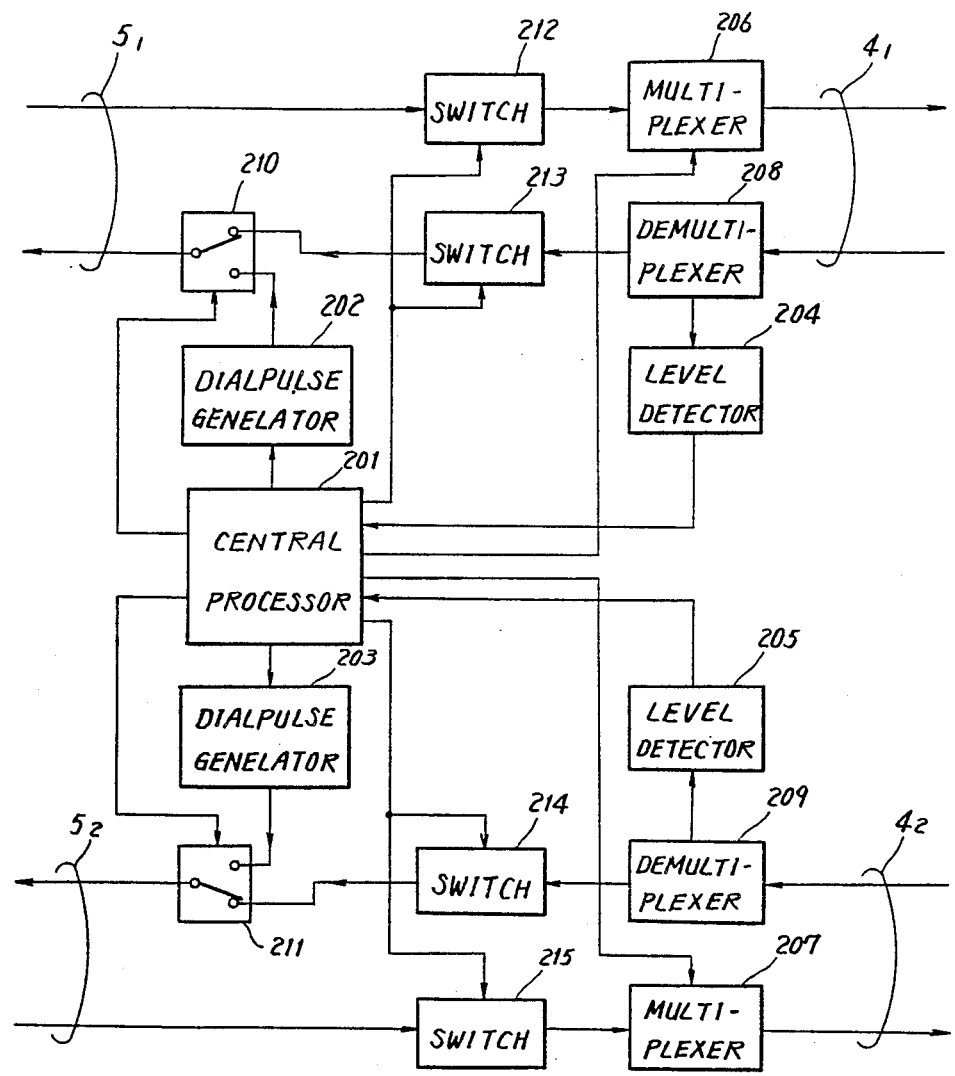
FIG. 5 is a block diagram of connection controller in an embodiment of the present invention.

FIG. 5 illustrates detail block diagram of the connection controller 2. In FIG. 5, 201 designates central processor, while 202 and 203 designate dial pulse generators, 204 and 205 designate level detectors, 206 and 207 designate multiplex circuits, 208 and 209 designate demultiplexer circuits, 210~215 designate switches. The connection controller 2 provides the circuits for similar functions as is illustrated for as many channels used by respective base stations among the stations $3_1 \sim 3_n$. In FIG. 5, only the circuit of one channel is shown for the radio base stations $3_1$ and $3_2$ for simplification of drawings.

Figure 6:
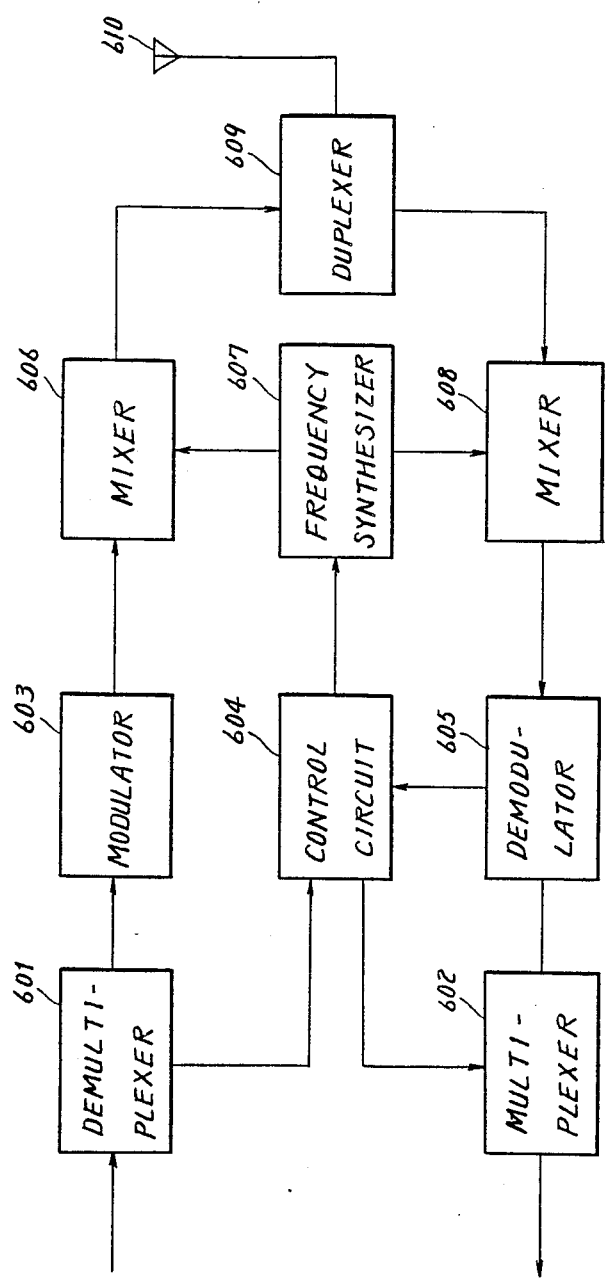
FIG. 6 is a block diagram of radio base station in an embodiment of the present invention.
Figure 7:
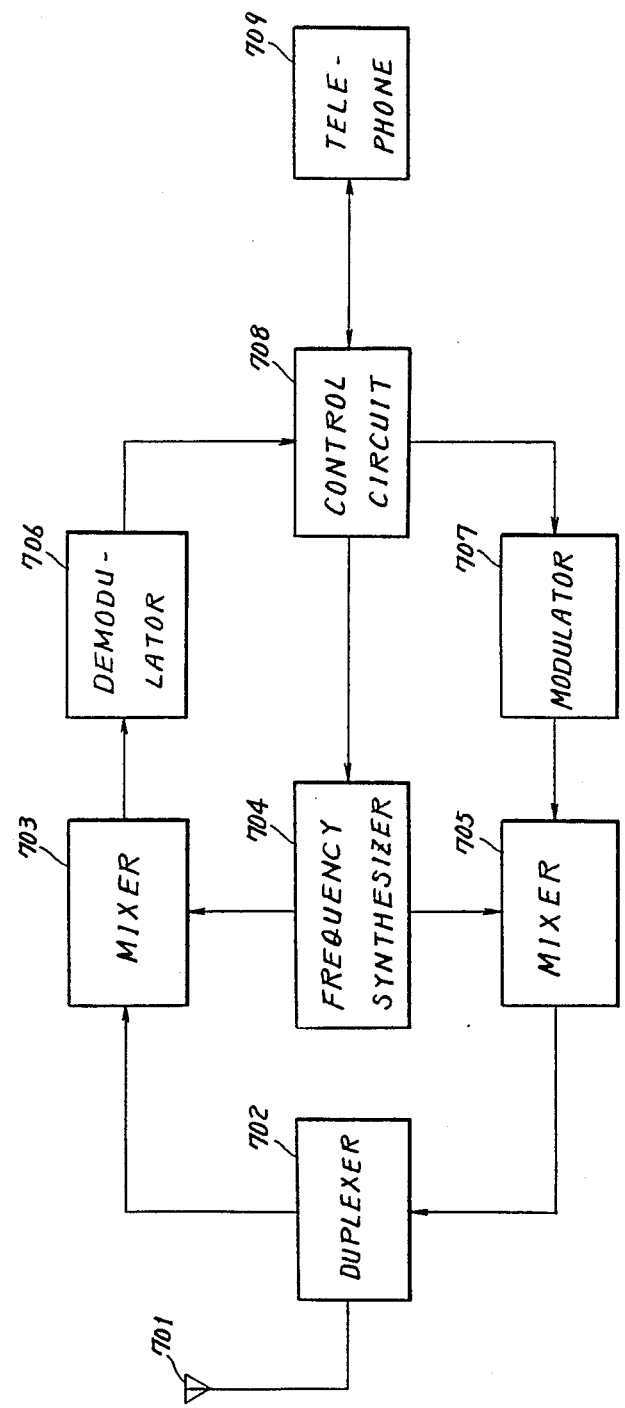
FIG. 7 is a block diagram of a movable station in an embodiment of the present invention.

FIG. 6 illustrates a block diagram of the radio base station 3. FIG. 7 illustrates a block diagram of a movable station 7. In the same figures, 601 is demultiplexer circuit, 602 is multiplexer circuit, 603 and 707 are modulators, 605 and 706 are demodulators, 606, 608, 703 and 705 are mixers, 607 and 704 are frequency synthesizers, 609 and 702 are duplexers, 610 and 701 are antennae, 604 and 708 are control circuits.

The operation of the embodiment of the mobile unit communication system of the present invention is explained hereinafter. It is assumed, as illustrated in FIG. 3, that a movable station 7 is located within the radio zone #1 of the radio base station $3_1$, communicating with the base station $3_1$ using the radio frequency $f_1$ and further communicating with an ordinary public telephone subscriber by extending the connection to the public telephone network 6 from such base station $3_1$ via the line $4_1$, connection controller 2, line $5_1$, and private branch exchanger 1.

In this case, the sending signal of frequency $f_1$ from the movable station 7 is also monitored by the other radio base stations $3_2 \sim 3_n$ and the termination level at these base stations are output from the demodulator 605 and supervised by the control circuit 604. The termination level signals from the base stations $3_1 \sim 3_n$ are frequency-multiplexed into the voice signals in the multiplex circuit 602 and are then sent to the connection controller 2 of the center station. Therefore, if the movable station 7 moves, for example, to the radio zone #2 from the radio zone #1, the receiving level of radio channel $f_1$ of the base station $3_1$ in the radio zone #1 is lowered, while the receiving level of radio channel $f_1$ of the base station $3_2$ in the radio zone #2 rises. Now that, the connection controller 2 detects that the movable station 7 has transferred to the radio zone #2 from the zone #1. Sending and receiving of control signal between base stations is done by multiplexing the frequency to the voice signal.

Upon detecting movement of movable station 7 of radio zone, the connection processor 2 issues a line changing command to the base stations $3_1$, $3_2$ and the private branch exchanger 1 in order to change the communication line for the movable station 7 to the base station $3_2$ from the base station $3_1$. For issuance of the line changing command, a dial pulse signal corresponding to the exchanger accommodation terminal location (exchanger line $5_1$) accommodating the base station line $4_1$ and a dial pulse signal corresponding to the exchanger accommodation terminal location (exchanger line $5_2$) accommodating the base station line $4_2$ are sent to the private branch exchanger 1.

Thereby, the private branch exchanger 1 changes the connection line to the movable station 7 to the exchanger line $5_2$ from the exchanger line $5_1$ through extension transfer. Simultaneously, the radio base station $3_1$ stops transmission of radio frequency $f_1$ used for the movable station 7 to suspend communication therewith and on the other hand, the radio base station $3_2$ starts communication with the movable station 7 using the radio frequency $f_1$ which has been used for communication with the base station $3_1$ before the transfer of radio zone. Thereby, communication with the movable station 7 through the base station line $4_1$ of the base station $3_1$ is changed to that through the base station line $4_2$ of the base station $3_2$. The channel changing during communication can thus be attained.

Detailed operations of the connection controller 2 are explained with reference to FIG. 5. The termination level signal of frequency $f_1$ of the base station $3_1$ can be detected by the level detector 204 through the base station line $4_1$. When reduction of termination level due to transfer of radio zone is detected by the level detector and rise of termination level of frequency $f_2$ in the base station $3_2$ is also detected by the level detector 205, the central processor 201 is notified. The central processor 201 issues a command to suspend communication with the movable station 7 by the frequency $f_1$ to the base station $3_1$ and also a command to start communication with the movable station 7 using the frequency $f_1$ to the base station $3_2$. Moreover, the central processor 201 also generates, by the dial pulse generator 202, the dial pulse signal indicating origination address (namely, the dial pulse signal corresponding to the base station line $4_1$) and the dial pulse signal indicating transfer destination (namely, the dial pulse signal corresponding to the base station line $4_2$) and then sends these dial pulse signals together with the extension transfer command to the private branch exchanger through the switch 210. The switches 212 and 213 are turned off, while the switches 214 and 215, on.

When the private branch exchanger 1 makes extension transfer to the exchanger line $5_2$ from the line $5_1$, the communication signal from the public telephone network 6 is thereafter sent and received by the base station line $4_2$ and thereby communication with the movable station 7 is established via the base station $3_2$.

As described, in the system of the present invention, the movable station is capable of continuously using the preset radio frequency until the end of conversation even after the communication is once started and it moves to the other radio zone. In addition, since changing of busy channel is carried out through the changing of wire system in the side of fixed station side, it is no longer necessary for the movable station to provide the channel changing mechanism during the conversation due to the transfer of radio zone by the movable station and structure of movable station can be simplified. Moreover, the fixed station can also be formed easily and economically by direct use of the extension transfer function without any design change of the existing private branch exchanger.

The embodiment of the present invention also allows various modifications and changes. For example, in above explanation, the radio frequency used for communication between the movable station and base stations can also be used even after the movable station has transferred to the other radio zone. Of course, for instance, it is also allowed to change the radio frequency used in the adjacent radio zones as is carried out in the ordinary automobile telephone system. Moreover, the connection controller is not limited only a single unit and a plurality of connection controllers may be accommodated within the private branch exchanger. In addition, it is further possible to prepare a plurality of private branch exchangers which are provided and arranged to each region in such a manner that the service area is comprised of the one area and the other area separated therefrom.

What is claimed is:

1. A channel changing system for connecting a public telephone network to a plurality of radio base stations to communicate with movable stations through radio channels, each of the radio base stations located in a corresponding radio zone and each of the radio base stations having a base station line, said channel changing system comprising:
   a private branch exchanger, having exchanger lines corresponding to the base stations, for electrically connecting the public telephone network to the base station lines extending from the plurality of radio base stations by connecting the public telephone network to the exchanger lines; and
   control means for detecting that one of the movable stations has transferred to the corresponding radio zone of an adjacent base station from the corresponding radio zone of an operating base station by monitoring signal receiving levels between the movable stations and the base stations and for controlling said private branch exchanger by generating an extension transfer command when it is detected that one of the movable stations has transferred to the corresponding radio zone of the adjacent base station,
   said private branch exchanger receives the extension transfer command and performs an extension transfer by transferring an extension from the base station line corresponding to the operating base station to the base station line corresponding to the adjacent base station based on the extension transfer command.

2. A channel changing system according to claim 1, wherein said control means issues dial pulse signals in addition to the extension transfer command, the dial pulse signals indicate one of an origination address and a transfer destination.

3. A channel changing system according to claim 1, wherein each of the plurality of radio base stations comprises multiplexing means for multiplexing the signal receiving levels into a communication signal, and
wherein said control means comprises demultiplexing means for extracting the signal receiving levels from the communication signal.

4. A channel changing system according to claim 2, wherein each of the plurality of radio base stations comprises multiplexing means for multiplexing the signal receiving levels into a communication signal, and
wherein said control means comprises demultiplexing means for extracting the signal receiving levels from the communication signal.

5. A channel changing system, comprising:
   a plurality of base stations for receiving radio signals having a plurality of predetermined frequencies and for providing level signals corresponding to each of the predetermined frequencies, each base station having a radio zone, and each radio zone having an adjacent radio zone;
   a movable station for transmitting radio signals of a specific predetermined frequency and for communicating with an operative base station in an operative radio zone containing said movable station;
   control means for issuing an extension transfer command when said movable station transitions from the operative radio zone to the adjacent radio zone based upon the level signals of the specific predetermined frequency received from each of said base stations; and
   a private branch exchanger means, operatively connected to said base stations via extension lines, for electrically connecting said base stations to a public telephone network, said private branch exchanger means including switching means for switching a first extension line receiving signals of the specific predetermined frequency from the operative base station to a second extension line receiving signals of the specific predetermined frequency from an adjacent base station as said movable station transitions from the operative radio zone to the adjacent radio zone in accordance with the extension transfer command.

6. A channel changing system according to claim 5, wherein said private branch exchanger means and said base stations communicate using frequency multiplexed signals.

7. A channel changing system according to claim 6, wherein said system further comprises a plurality of movable stations, each movable station transmitting radio signals having only one of the predetermined frequencies at a given time, and each movable station using a different frequency.

* * * * *